April 6, 1937.  P. SCHLUMBOHM  2,075,831
DEVICE FOR COOLING OR WARMING A LIQUID
Filed Nov. 8, 1935  2 Sheets-Sheet 1
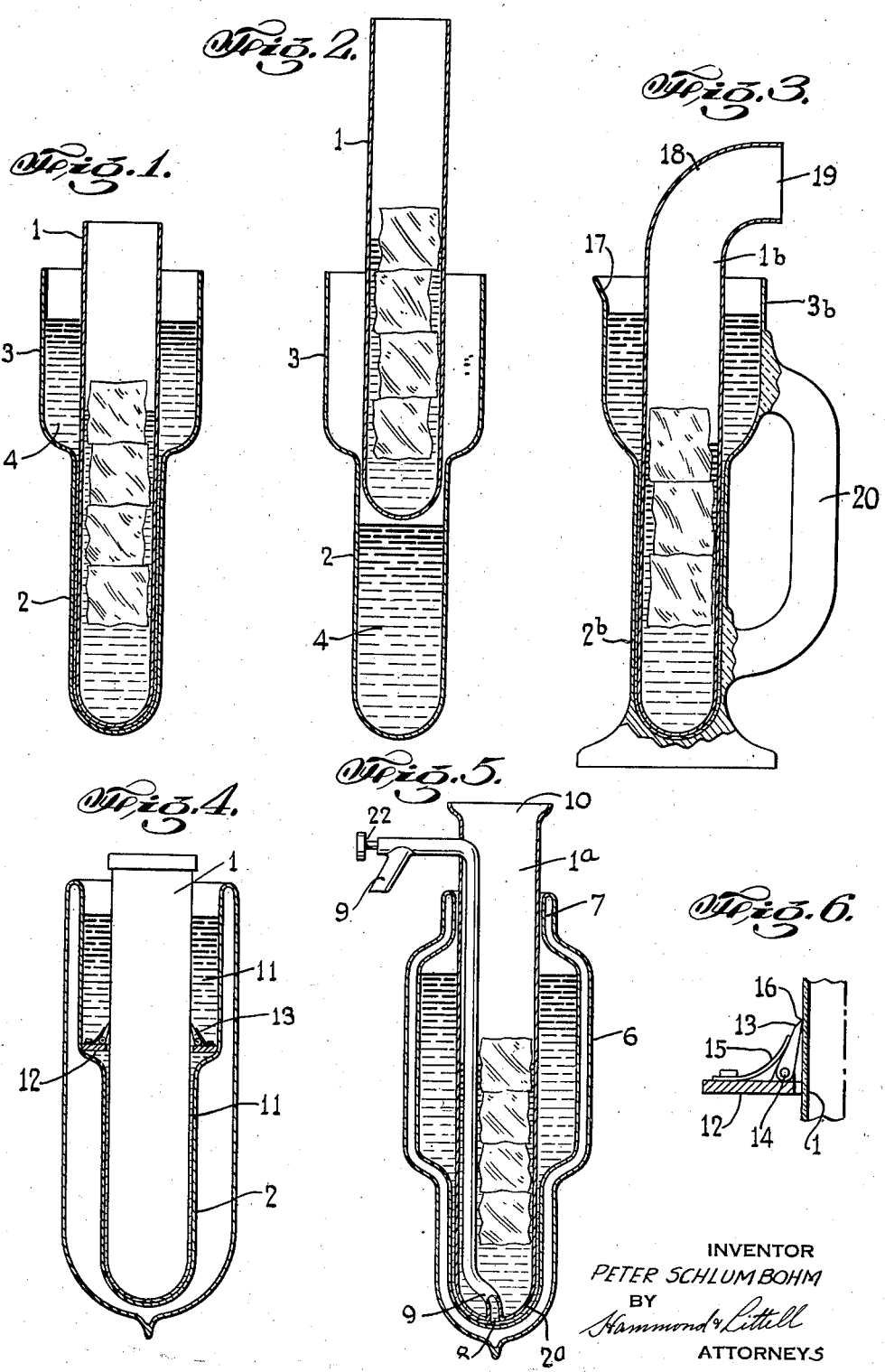
INVENTOR
PETER SCHLUMBOHM
BY
Hammond & Littell
ATTORNEYS

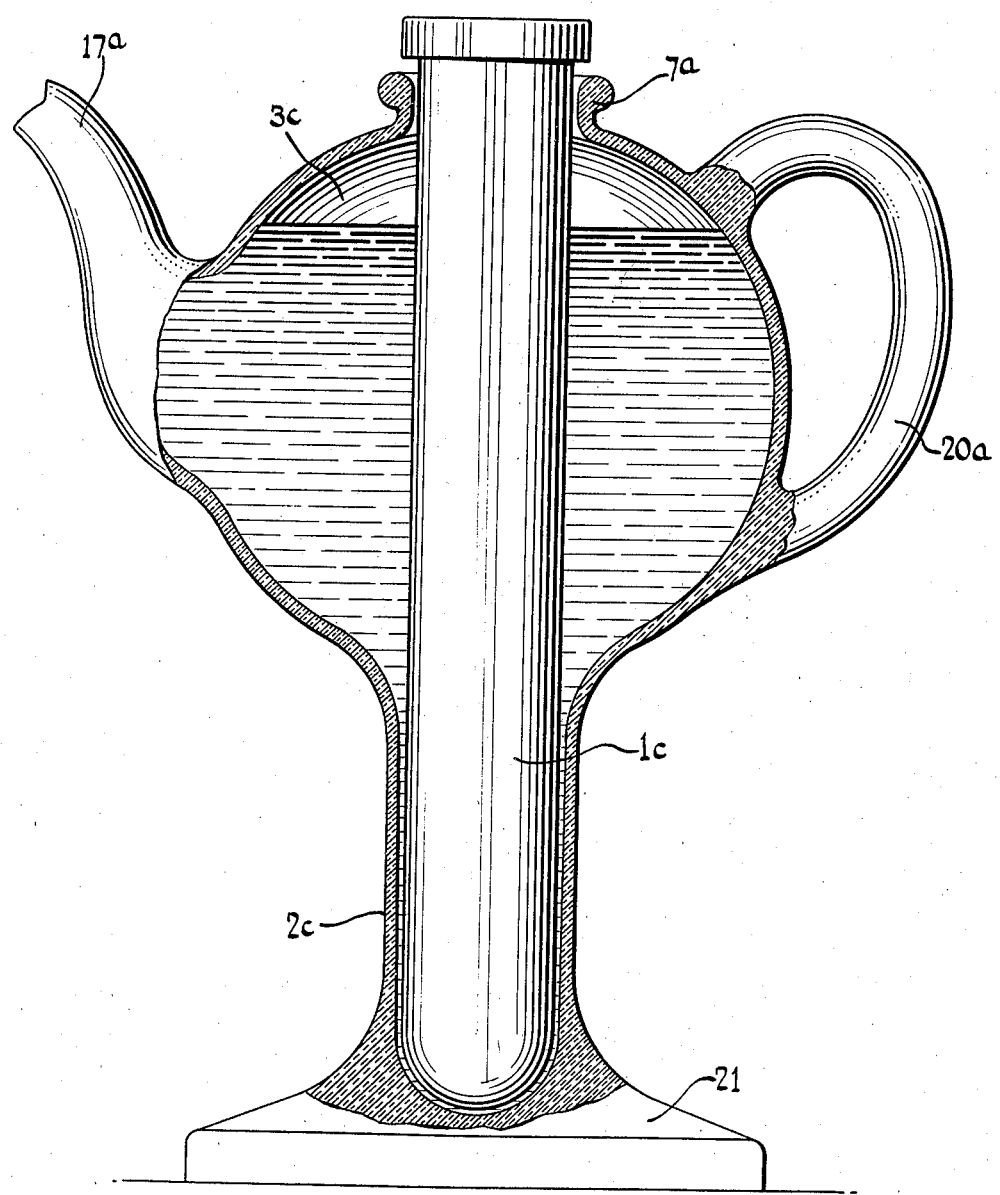

Patented Apr. 6, 1937

2,075,831

UNITED STATES PATENT OFFICE 2,075,831

DEVICE FOR COOLING OR WARMING A LIQUID

Peter Schlumbohm, New York, N. Y.

Application November 8, 1935, Serial No. 48,901

18 Claims. (Cl. 62—1)

The invention relates to a device for cooling or warming a liquid, and also for mixing and dispensing the same. The invention further involves a new method of cooling or warming a liquid within the container for the liquid.

More specifically, the invention aims to provide a device for table use, by means of which a beverage may be cooled quickly and intensively by means of water ice without diluting the beverage by the water ice; the device is also designed for warming gently red wine by means of warm water and finally in combination with a small accessory, ice scraper, the device may serve for freezing home-made ice cream by means of water ice freezing mixtures, carbon dioxide ice or the like.

The special feature of the method and of the device which makes it practical for this variety of purposes is the fact that the principles of indirect heat exchange are very carefully considered and followed. For effective heat exchange between the liquid to be cooled or heated and the wall of a container which contains the cooling medium such as water ice, or the heating medium such as warm water, it is extremely important to steadily renew the molecular skin of the liquid which is in contact with the wall of said container, and it is equally important to shape the container which contains the cooling or heating medium so that a maximal specific surface of its wall per cubic centimeter of its contents is exposed to said molecular skin of the liquid. Thirdly, on the other side of the wall, meaning on the inside of the container which contains cooling or heating means, a renewal of the surface must be provided by moving the cooling or heating means, or by moving the container.

For accomplishing those cooling or heating tasks and for complying with these technical principles, I have designed a container in combination with a plunger which shows the following characteristics and variations.

Part of the wall of the container which contains the liquid is built in the form of a tubular chamber. The tubular chamber is designed to act in combination with a plunger as a pump for pumping the liquid. The pump may be valveless but may also be constructed in connection with valves and tubing means as known in the art. However, just the most simple valveless type of this plunger pump answers most of the purposes in a very efficient way.

Figures 1 and 2 are sectional views of a device embodying the invention in which the plunger is shown in its inner and outer positions, respectively, Fig. 3 is a sectional view of another embodiment wherein the upper end of the plunger is formed at an angle to avoid spilling the contents in the plunger when pouring the beverage from the outer container, Fig. 4 shows another embodiment in which the liquid container is formed as a vacuum insulated container. and in which a scraper device is provided for scraping ice from the exterior surface of the plunger, Fig. 5 shows another embodiment in which the container is formed as a vacuum insulated container and the plunger carries a valve discharge tube, and Fig. 6 is a detail view of the scraper device shown in Fig. 4, Fig. 7 shows an embodiment in which the liquid container has a teapot-like shape.

In order to simplify the explanation, I will refer in the following to cooling a liquid and it is obvious that the same arrangements are applied for warming the liquid if the refrigerant means such as water ice, is replaced by a heating means such as warm water. Furthermore, I shall speak only of ice as illustrative of the refrigeration means in general. Aside from water ice, water ice freezing mixtures or carbon dioxide ice may be used in the device.

In Figure 1, the container for the liquid has a wider upper part and a tubular narrower lower part. A plunger I fits closely into the tubular chamber 2, the space between the outside wall of the plunger I and the inside wall of the chamber 2, is narrow and preferably of the size of one millimeter. The plunger I is a tubular container open at one end, and serves as the container for the ice. As I aim especially at table use equipment for cooling beverages in households, I prefer to design the container I so that its diameter is just wide enough to allow the passage of standard ice cubes through the opening, and to pile up a column of these ice cubes corresponding to the length of the container. This may go so far as to select a square cross-section for the tubular container I and for the tubular chamber 2. However, cylindrical constructional elements being cheaper in the making, of the apparatus, I prefer round cross-sections for both parts.

In Fig. 1, the plunger I is shown as filling fully the chamber 2, thus forcing the liquid into the upper part 3 of the container. The upper part 3 of the container has a volume capacity of at least twice the volume capacity of the lower part 2 and allows for some reasonable surplus volume in order to avoid spilling; the general relation between the volumes of part 3 and part 2 may be in the proportion of 2:1.

As the diameter of the tubular plunger 1 is determined by the diameter of the chamber 2, the size of the device, as designed for various capacities, can be easily anticipated. Of course, the shape of the device is further dictated by questions of taste and style, and Figures 3 and 5 illustrate two modifications by way of example.

The function of the parts 1, 2 and 3 of Figure 1, will be clear by comparing Fig. 2 with Fig. 1. In Fig. 2, the plunger, which is at the same time the ice container, has been moved upwards; preferably by hand. In moving the plunger 1 upwards a vacuum is created before the piston head of the plunger in the chamber 2, and the liquid 4 is forced quickly through the narrow annular space between the plunger and the tubular chamber 2 to pass into said chamber 2. In so doing, the liquid is steadily renewing its surface which is in contact with the wall of the ice container 1 and a perfect heat exchange is effected. By moving the plunger 1 downwards, back to the position as illustrated in Fig. 1, the liquid is forced out of chamber 2 back to the upper part 3 of the container, again undergoing a good heat exchange within the cooling space as created between the walls of part 1 and part 2.

I have found that by applying this method and by using the device as described herein, an effective cooling of beverages is obtained, and that the results are far better than with any known device constructed on the basis of the indirect heat exchange.

I am of the opinion that my device operating on the principle of indirect heat exchange is not only as effective as the direct heat exchange, meaning putting ice directly into the beverage, but shows even superior results. The superior results are due to the possibility of applying freezing mixtures inside the plunger 1 which are colder than water ice alone, and the superiority also concerns the quality of the drink which now is not diluted by water ice if the new device is used.

For obvious reasons it will be practical to make the container out of glass, and to make the plunger out of metal. However, I have also obtained good results when choosing glass as the material for the plunger as well.

The device has a special appeal if the container which holds the liquid is constructed with a heat insulating jacket, especially in the form of a double-walled vacuum container. Such a modification is illustrated in Fig. 5 by way of example and diagrammatically to point out a few special features.

The tubular chamber 2a as required for the plunger 1a, is formed by the inside wall 5 of the vacuum container 6. The tubular chamber 2a is arranged concentrically in the bottom of the vacuum container and its inside diameter is so chosen as to be in suitable relation to the inside diameter of the neck 7 of the vacuum container. The tubular plunger 1a should be guided by the neck 7 of the vacuum container as well as by the chamber 2a, in order to avoid binding of the plunger against the inside wall of the container 6.

As a vacuum container is in danger of breaking when handled while loaded with a heavy content, the plunger 1a is designed for the additional function of pumping the liquid out of the vacuum container. For this purpose the piston of the plunger has an opening 8 and tubular means 9 are provided to guide the liquid when forced into said tubular means by a downward stroke of the plunger 1a. The plunger 1a may be filled through its opening 10 with ice, or with warm water, whichever purpose is intended to be served. The plunger 1a and the tubular means 9 may be made out of glass preferably, as they are likely to be in contact with the liquid for a long period of time. The tap 22 may close tube 9 for cooling purposes.

For the purpose of making ice cream by means of a water ice freezing mixture, brine, carbon dioxide ice or the like, a small accessory is provided as illustrated in detail in Fig. 6 and as shown within the apparatus in Fig. 4. It is intended to freeze the liquid 11 into ice while in the narrow annular heat exchange space between the plunger 1 and the wall of the tubular chamber 2. This means that after a downward stroke the outside surface of the plunger 1 will be covered with ice and it is necessary to dislodge this ice skin before the next downward stroke. This is done for instance by the means as indicated in Figs. 4 and 6. A ring shaped strip of metal 12 is equipped with blades 13. The blades 13 are movable on the pivot 14 and are under the pressure of springs 15. The springs 15 are weak enough to give way when the ice coated plunger 1 makes an upward stroke. On the downward stroke, the edge 16, due to its design, acts as a scraper on the surface of the plunger 1, thus dislodging the ice. Passages must be provided to allow unfrozen parts of the liquid to flow into the chamber 2 during an upward stroke.

Fig. 3 shows a model which is especially suitable for cooling beer or other liquids which form a foam; in this case the upper part 3b must be over dimensioned as far as the above mentioned volume relation to the chamber 2b is concerned, in order to leave space for the foam and a conveniently broad spout 17 is provided. The upper part of the plunger 1b is bent at an angle to form a knee 18. This is to avoid the necessity of a stopper for closing the opening 19 of the plunger and yet to avoid spilling of ice water when the beer is poured by means of handle 20.

Fig. 7 is constructed by combining constructional elements which are already popular. The upper part 3c of the container is built like a teapot with spout 17a, a handle 20a and a neck 7a. The lower part which forms the tubular chamber 2c for the plunger 1c is built in the form of a cylinder with a base 21 as an integral part. These constructional elements moreover are available as molded standard glass pieces and can be welded together to form one integral part by the technique of glass blowing. The bottom of the teapot 3c can be bent up and the edges can be welded to the edges of the cylindrical vase 2c. On the other hand, of course, it will be still more convenient to form the parts of 3c and 2c as one molded blank to which thereafter the spout 17a and the handle 20a are attached. The plunger 1c is built as a cylindrical tube fitting into the tubular chamber 2c. Before pouring the liquid the plunger 1c is moved upwards and downwards several times to cool the liquid and to mix it thoroughly.

The lower part which forms the tubular chamber of each device, being particularly suitable for measuring the various ingredients, e. g. when mixing a cocktail, and being preferably made out of a transparent material such as glass, is graduated with a scale. The various ingredients are filled into this part of the container after the plunger has been removed.

I may mention that as to each embodiment of the invention there is no danger of breaking the plunger when pushing it down into the tubular chamber, due to the fact that the liquid which is forced through the annular heat exchange space works as a brake. This is very convenient in handling the device especially when made entirely out of glass. The surface of the plunger may be prepared for instance by roughening the surface or by providing recesses, for improved heat exchange by enlarging the surface of the wall.

Having now described the nature of my invention, and having indicated by way of example various modifications of the way in which it is to be performed, both as a method and as a device, and claiming logical variations both of the method and of the device to be within the scope of my claims,

What I claim is:

1. A mixing device comprising a liquid container member having a section of reduced cross section, a plunger member adapted to fit relatively closely in said section and to be moved in and out through said section to pump liquid in the container through the reduced section in a thin layer between the container and plunger.

2. A mixing device, as defined in claim 1, wherein provision is made whereby one member may act as a cooling element for the liquid when pumped along the surface thereof in a thin layer.

3. A mixing device, as defined in claim 1, wherein the plunger is hollow and forms a container for a cooling medium.

4. A mixing device, as defined in claim 1, wherein the container is formed of glass and the plunger member is formed of metal.

5. A mixing device, as defined in claim 1, wherein a conduit leading from beneath the plunger is provided to permit discharge of liquid from the container when the plunger is moved into the container.

6. A mixing device, as defined in claim 1, wherein the plunger is formed with a conduit extending upwardly therethrough with a discharge outlet whereby the plunger may be operated as a pump to discharge liquid from the container through said conduit.

7. A mixing device, as defined in claim 1, wherein the plunger is formed with a conduit extending upwardly therethrough with a discharge outlet whereby the plunger may be operated as a pump to discharge liquid from the container through said conduit and wherein a valve is provided to control said conduit.

8. A mixing device, as defined in claim 1, wherein the section of reduced cross section is cylindrical and the plunger member fits relatively closely therein throughout the length of said section.

9. A mixing and cooling device comprising a container having toward its bottom a cylindrical section of relatively small diameter with a larger section above said cylindrical section, a hollow plunger adapted to contain a cooling medium insertable in said container and into said cylindrical section, the space between said container at the cylindrical section and the plunger being small, whereby when the plunger is moved up or down the contained liquid is pumped in a thin layer through the restricted space and in intimate heat exchange relation with the plunger wall.

10. A mixing device comprising a liquid container member having upper and lower sections of reduced cross-section and an intermediate section of larger cross-section, a plunger member adapted to fit relatively closely in and to be moved in and out through and to be guided by said sections to pump liquid in the container into and out of the lower section in a thin layer between the container and plunger.

11. A mixing device, as defined in claim 10, wherein provision is made whereby the plunger member may act as a heat exchange element for liquid when pumped along the surface thereof in a thin layer.

12. A mixing device, as defined in claim 10, wherein the plunger is hollow and forms a container for a cooling medium.

13. A mixing device comprising a liquid container and a hollow cylindrical plunger reciprocably mounted therein, the container having a lower cylindrical section forming a mixing chamber in which the plunger fits relatively closely, a relatively large intermediate section and an upper guide section in which the plunger fits relatively closely.

14. A mixing device comprising a container having a section of uniform cross-section constituting a mixing chamber with a second section constituting a second chamber, a heat exchange unit insertable in said container and into said mixing chamber and having a section of uniform cross-section fitting somewhat closely in said mixing chamber whereby when the heat exchange unit is reciprocated in the container the contained liquid in a thin layer is pumped through the restricted space between the container wall and the heat exchange unit and in intimate heat exchange relation with the heat exchange unit.

15. A mixing device comprising a liquid container, a cylindrical plunger reciprocable in said container, a scraper device within said container and surrounding said plunger and having a plurality of blades yieldably engaging the plunger and means restraining said scraper device from movement in said container during a reciprocation of said plunger.

16. A mixing device, as defined in claim 1, characterized by the provision of means within the container member for scraping ice from the surface of the plunger member.

17. A device for mixing and cooling a liquid, comprising a container for the liquid and a container for a heat exchange medium, the diameters of said containers approximating each other at least in a part of their total lengths to provide pumping action by inserting the smaller container into the larger container and moving it as a plunger within said larger container.

18. A teapot-like container with an elongated chamber extruding from the bottom in the axis of the filling opening and a plunger adapted to be inserted into said pot and into said chamber, the upper part of said plunger being adapted to close the filling opening and to form a grip for the hand whereby it can be moved up and down within said teapot-like container.

PETER SCHLUMBOHM.